(12) United States Patent
Kessler et al.

(10) Patent No.: US 6,754,739 B1
(45) Date of Patent: Jun. 22, 2004

(54) COMPUTER RESOURCE MANAGEMENT AND ALLOCATION SYSTEM

(75) Inventors: Richard E. Kessler, Shrewsbury, MA (US); Michael S. Bertone, Marlborough, MA (US); Gregg A. Bouchard, Round Rock, TX (US); Maurice B. Steinman, Marlborough, MA (US)

(73) Assignee: Hewlett-Packard Development Company, Houston, TX (US)

( * ) Notice: Subject to any disclaimer, the term of this patent is extended or adjusted under 35 U.S.C. 154(b) by 458 days.

(21) Appl. No.: 09/651,945

(22) Filed: Aug. 31, 2000

(51) Int. Cl.[7] .............................................. G06F 13/00

(52) U.S. Cl. ................................ 710/52; 710/5; 710/7; 710/36; 710/53; 710/56; 711/147; 702/201

(58) Field of Search ........................... 710/5, 7, 36, 52, 710/53, 56; 711/147; 702/201

(56) References Cited

U.S. PATENT DOCUMENTS

| | | | | |
|---|---|---|---|---|
| 5,255,387 A | * | 10/1993 | Arnold et al. | 707/201 |
| 5,261,066 A | | 11/1993 | Jouppi et al. | 395/425 |
| 5,313,649 A | * | 5/1994 | Hsu et al. | 710/317 |
| 5,317,718 A | | 5/1994 | Jouppi | 395/425 |
| 5,412,803 A | * | 5/1995 | Bartow et al. | 709/213 |
| 5,758,183 A | | 5/1998 | Scales | 395/825 |
| 5,761,729 A | | 6/1998 | Scales | 711/148 |
| 5,787,480 A | | 7/1998 | Scales et al. | 711/148 |
| 5,802,585 A | | 9/1998 | Scales et al. | 711/154 |
| 5,809,450 A | | 9/1998 | Chrysos et al. | 702/186 |
| 5,875,151 A | | 2/1999 | Mick | 365/233 |
| 5,890,201 A | | 3/1999 | McLellan et al. | 711/108 |
| 5,893,931 A | | 4/1999 | Peng et al. | 711/206 |
| 5,911,149 A | * | 6/1999 | Luan et al. | 711/147 |
| 5,918,250 A | | 6/1999 | Hammond | 711/205 |
| 5,918,251 A | | 6/1999 | Yamada et al. | 711/207 |
| 5,923,872 A | | 7/1999 | Chrysos et al. | 395/591 |
| 5,950,228 A | | 9/1999 | Scales et al. | 711/148 |
| 5,964,867 A | | 10/1999 | Anderson et al. | 712/219 |
| 5,983,325 A | | 11/1999 | Lewchuk | 711/137 |
| 6,000,044 A | | 12/1999 | Chrysos et al. | 714/47 |
| 6,047,356 A | * | 4/2000 | Anderson et al. | 711/129 |
| 6,070,227 A | | 5/2000 | Rokicki | 711/117 |
| 6,085,300 A | | 7/2000 | Sunaga et al. | 711/168 |
| 6,088,777 A | * | 7/2000 | Sorber | 711/171 |
| 6,349,312 B1 | * | 2/2002 | Fresko et al. | 707/205 |

OTHER PUBLICATIONS

*Alpha Architecture Reference Manual*, Third Edition, The Alpha Architecture Committee, 1998 Digital Equipment Corporation (21 p.), in particular pp. 3–1 through 3–15.
*A Logic Design Structure For LSI Testability*, E. B. Eichelberger et al., 1977 IEEE (pp. 462–468).
*Direct RDRAM ™ 256/288–Mbit (512K×16/18×32s)*, Preliminary Information Document DL0060 Version 1.01 (69 p.).
*Testability Features of AMD–K6 ™ Microprocessor*, R. S. Fetherston et al., Advanced Micro Devices (8 p.).

(List continued on next page.)

Primary Examiner—Jeffrey Gaffin
Assistant Examiner—Mohammad O. Farooq

(57) ABSTRACT

A method and architecture for improved system resource management and allocation for the processing of request and response messages in a computer system. The resource management scheme provides for dynamically sharing system resources, such as data buffers, between request and response messages or transactions. In particular, instead of simply dedicating a portion of the system resources to requests and the remaining portion to responses, a minimum amount of resources are reserved for responses and a minimum amount for requests, while the remaining resources are dynamically shared between both types of messages. The method and architecture of the present invention allows for more efficient use of system resources, while avoiding deadlock conditions and ensuring a minimum service rate for requests.

28 Claims, 3 Drawing Sheets

OTHER PUBLICATIONS

*Hardware Fault Containment in Scalable Shared–Memory Multiprocessors*, D. Teodosiu et al., Computer Systems Laboratory, Stanford University (12 p.), 1977.

*Cellular Disco: resource management using virtual clusters on shared–memory multiprocessors*, K. Govil et al., 1999 ACM 1–58113–140–2/99/0012 (16 p.).

*Are Your PLDs Metastable?*, Cypress Semiconductor Corporation, Mar. 6, 1997 (19 p.).

*Rambus® RIMM ™ Module (with 128/44Mb RDRAMs)*, Preliminary Information, Document DL0084 Version 1.1 (12 p.).

*Direct Rambus ™ RIMM ™ Module Specification Version 1.0*, Rambus Inc., SL–0006–100 (32 p.), 2000.

*End–To–End Fault Containment In Scalable Shared–Memory Multiprocessors*, D. Teodosiu, Jul. 2000 (148 p.).

\* cited by examiner

COMPUTER RESOURCE MANAGEMENT AND ALLOCATION SYSTEM

CROSS-REFERENCE TO RELATED APPLICATIONS

This application relates to the following commonly assigned co-pending applications entitled:

"Apparatus And Method For Interfacing A High Speed Scan-Path With Slow-Speed Test Equipment," Ser. No. 09/653,642, filed Aug. 31, 2000, "Priority Rules For Reducing Network Message Routing Latency," Ser. No. 09/652,322, filed Aug. 31, 2000, "Scalable Directory Based Cache Coherence Protocol," Ser. No. 09/652,703, filed Aug. 31, 2000, "Scalable Efficient I/O Port Protocol," Ser. No. 09/652,391, filed Aug. 31, 2000, "Efficient Translation Lookaside Buffer Miss Processing In Computer Systems With A Large Range Of Page Sizes," Ser. No. 09/652,552, filed Aug. 31, 2000, "Fault Containment And Error Recovery Techniques In A Scalable Multiprocessor," Ser. No. 09/651,949, filed Aug. 31, 2000, "Speculative Directory Writes In A Directory Based Cache Coherent Nonuniform Memory Access Protocol," Ser. No. 09/652,834, filed Aug. 31, 2000, "Special Encoding Of Known Bad Data," Ser. No. 09/652,314, filed Aug. 31, 2000, "Broadcast Invalidate Scheme," Ser. No. 09/652,161, filed Aug. 31, 2000, "Mechanism To Track All Open Pages in A DRAM Memory System," Ser. No. 09/652,701, filed Aug. 31, 2000, "Programmable DRAM Address Mapping Mechanism," Ser. No. 09/653,093, filed Aug. 31, 2000, "Computer Architecture And System For Efficient Management Of Bi-Directional Bus," Ser. No. 09/652,323, filed Aug. 31, 2000, "An Efficient Address Interleaving With Simultaneous Multiple Locality Options," Ser. No. 09/652,452, filed Aug. 31, 2000, "A High Performance Way Allocation Strategy For A Multi-Way Associative Cache System," Ser. No. 09/653,092, filed Aug. 31, 2000, "Method And System For Absorbing Defects In High Performance Microprocessor With A Large N-Way Set Associative Cache," Ser. No. 09/651,948, filed Aug. 31, 2000, "A Method For Reducing Directory Writes And Latency In A High Performance, Directory-Based, Coherency Protocol," Ser. No. 09/652,324, filed Aug. 31, 2000, "Mechanism To Reorder Memory Read And Write Transactions For Reduced Latency And Increased Bandwidth," Ser. No. 09/653,094, filed Aug. 31, 2000, "System For Minimizing Memory Bank Conflicts In A Computer System," Ser. No. 09/652,325, filed Aug. 31, 2000, "Input Data Recovery Scheme," Ser. No. 09/653,643, filed Aug. 31, 2000, "Fast Lane Prefetching," Ser. No. 09/652,451, filed Aug. 31, 2000, "Mechanism For Synchronizing Multiple Skewed Source-Synchronous Data Channels With Automatic Initialization Feature," Ser. No. 09/652,480, filed Aug. 31, 2000, and "Mechanism To Control The Allocation Of An N-Source Shared Buffer," Ser. No. 09/651,924, filed Aug. 31, 2000, and "Chaining Directory Reads And Writes To Reduce DRAM Bandwidth In A Directory Based CC-NUMA Protocol," Ser. No. 09/652,315, filed Aug. 31, 2000, all of which are incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to a method and architecture for managing and allocating resources in a computer system. More particularly, the invention relates to a resource allocation and management scheme for memory buffers that ensures system progress (i.e., prevents system deadlock), maximizes utilization of available system resources, and guarantees a minimum service rate for requests.

2. Background of the Invention

In a microprocessor based computer system, there are generally two types of messages or transactions: requests and responses. Requests are when the processor needs information. Requests place demands on resources and include actions such as reads and fetches. Requests allocate or tie up a resource while it handles or deals with the request. Responses typically satisfy requests and include completion messages and write backs. Responses deallocate or free up resources by indicating that the resource is done or available. The system resources receiving messages are typically memory or input or output ("I/O") devices.

Computer systems often attempt to control the issuance of response and request messages in order to optimize system performance. This control of the messages often occurs using pending transaction logic which queues the messages and then selectively issues the messages based on certain predetermined criteria. Additionally, buffers may be employed in the computer memory system to hold data relating to the messages until the message is completed or the data is fully consumed or used. These buffers facilitate data prefetching by allowing memory controllers to buffer the data in advance of its need in order to minimize the perceived memory latency. Buffer usage, like other resources in a computer system, is managed by operations architecture and/or logic known as resource management or allocation schemes.

Despite the system control over the issuance of transactions or messages, there are still differing numbers of requests and responses issued by the system at any given time. In fact, all of the pending transactions may be one type of message or the other. This imbalance between requests and responses means the system can not simply alternate between requests and responses (not to mention that this may not be the most efficient scheme for optimal system performance). Necessarily, then, there will be times when multiple request or response messages must be issued consecutively.

A problem can occur, however, when a continuous stream of request messages is issued. In particular, if response messages are indefinitely blocked by a continuous stream of request messages, a deadlock condition may exist. Specifically, since responses are required to deallocate or free up resources, when responses are blocked, system resources can not be freed. Since requests require allocation of system resources, and since these resources can not be freed up by the blocked response messages, there is the potential for a deadlock. Obviously, any resource management scheme must avoid this condition. The key is that where responses and requests are using the same physical resources, requests must not indefinitely block responses or else deadlock may occur.

Therefore, where the same memory buffers are used in a system to hold data for responses and requests, the buffers must be managed such that the buffers do not become full of requests with no opportunity for responses to go through. This could result in a deadlock where the requests are waiting for resources to free up and the resources can not be deallocated because a response message can not be processed. Moreover, some response messages require an allocation and deallocation of resources such as a read-modify-write operation where the data must first be read, then modified, and then written back to the resource. This kind of operation can be required for parity or where only a portion of the data is being overwritten and the remainder of the data must be retained. Obviously, these operations will similarly be deadlocked when the read portion of the response message is blocked due to all of the available buffer resources being taken up by pending requests waiting for responses which can not be processed.

To avoid this problem, many systems simply dedicate a certain amount of the buffers or other system resources to requests and a certain amount to responses. Often the available resources are just split between requests and responses; for example, half of the available buffer size would be dedicated to requests and the other half to responses. This can be wasteful and inefficient, however, if there are not equal amounts of requests and responses to process. Specifically, if a stream of requests (or responses) needs to be processed, only half of the available buffer can be used. The other half of the buffer is reserved for responses (or requests) even if none are currently pending. This results in decreased system performance and under-utilization of the system's available resources.

The present invention is directed at a method and architecture for dynamically sharing system resources, such as buffers, between requests and responses to enhance system performance while avoiding system deadlocks.

BRIEF SUMMARY OF THE INVENTION

In accordance with the present invention, there is provided a novel method and architecture for system resource allocation and management. In particular, the method and architecture of the present invention allow for a novel resource management scheme to be utilized wherein system resources are dynamically shared resulting in enhanced system performance. This is accomplished by reserving a minimum amount of system resources for responses and a minimum amount of resources for requests, while the remainder of system resources is dynamically shared between responses and requests. This more efficiently uses the available system resources to enhance system performance, while ensuring no system deadlocks and a minimum service rate for requests.

The inventive architecture for resource management and allocation of system resources in a microprocessor-based system, comprises: pending transaction logic managing request and response messages; a buffer having a plurality of entries coupled to the pending transaction logic for storing data associated with the request and response messages; and status control logic coupled to the buffer for monitoring the allocation status of the entries in the buffer; wherein a first entry of the buffer is reserved for response messages only, a second entry is reserved for request messages only, and the remaining entries of the buffer are indiscriminately shared between request and response messages.

The inventive method of managing and allocating system resources, comprises: providing pending transaction logic that manages request and response messages; providing a buffer having a plurality of entries coupled to the pending transaction logic for storing data associated with the request and response messages; providing status control logic coupled to the pending transaction logic and coupled to the buffer for monitoring the allocation status of the entries in the buffer; reserving a first entry of the buffer for response messages only; reserving a second entry of the buffer for request messages only; and sharing the remaining entries of the buffer indiscriminately between the request and response messages.

And finally, the inventive computer system having novel architecture for resource management and allocation of system resources, comprises: an I/O device; a microprocessor; pending transaction logic coupled to the microprocessor and coupled to the I/O device where the pending transaction logic manages request and response messages to and from the microprocessor; a buffer having a plurality of entries coupled to the pending transaction logic for storing data associated with the request and response messages; status control logic coupled to the buffer for monitoring the allocation status of the entries in the buffer; wherein a first entry of the buffer is reserved for response messages only a second entry is reserved for request messages only, and the remaining entries of the buffer are indiscriminately shared between the request and response messages.

BRIEF DESCRIPTION OF THE DRAWINGS

The invention can be more fully understood by referencing the accompanying drawings wherein.

NOTATION AND NOMENCLATURE

Figure 1:
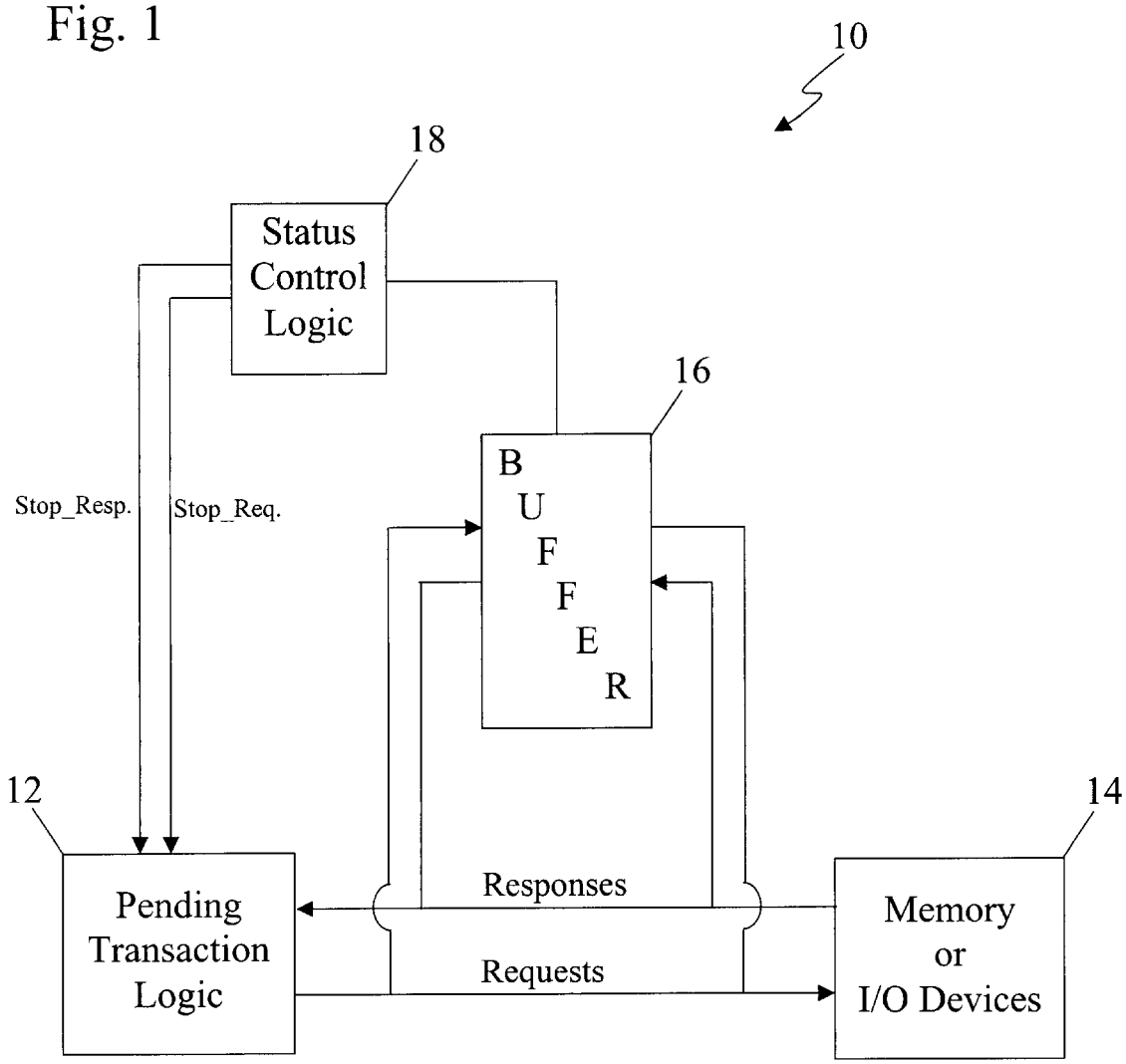
FIG. 1 shows a block diagram of a computer resource management and allocation system contemplated by the present invention.

Certain terms are used throughout the following description and claims to refer to particular system components. As one skilled in the art will appreciate, components may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE DRAWINGS

Referring now to the drawings, wherein like reference characters denote corresponding components or parts:

FIG. 1 shows a block diagram of a computer resource management and allocation system 10 contemplated by the present invention. This system 10 has been implemented in a high performance microprocessor die to enhance performance of request and response messages processed, as more fully described in the applications incorporated by reference herein. FIG. 1 shows a functional block diagram of the architecture as employed in the preferred embodiment of the microprocessor die; however, the same or similar architecture could be implemented as any part of a computer system not just on-chip in a microprocessor.

As response and request transactions or messages arrive at the microprocessor, the messages are queued by pending transaction logic 12. The pending transaction logic 12 allows requests and responses to be processed efficiently using predetermined criteria such as forward- or backward-looking architecture to group requests or responses together where they can be handled more efficiently consecutively or in some other order. How the pending transaction logic 12 issues the request and response messages from the transaction queue is not critical to the present invention. As shown, the messages are coupled to and from the pending transaction logic 12 and the target system resources, such as memory and I/O devices 14. As indicated, some request and response messages may have data that is stored in a buffer 16. The buffer 16 can be one device or several devices but for purposes of this discussion will be treated as one monolithic fill buffer having a plurality of entries or locations to store message data. Unlike some prior art systems where the responses and requests had separate paths, both responses and requests are routed to the same buffer 16. As noted, buffering the messages can enhance system performance. For example, the buffer 16 facilitates data prefetching allowing data to be retrieved and placed in the buffer in advance of its need in order to minimize the perceived memory latency. While some messages or transactions can be more efficiently processed by holding the data in a memory buffer 16, other messages require buffering such as read-modify-write operations. Regardless of why the buffer 16 is being used, buffer usage, like other resources in a computer system, must be managed to optimize the allocation and deallocation of the buffer resources.

To monitor the status of the buffer 16 and manage its use, status control logic 18 is coupled to the buffer 16. The status control logic 18 tracks the allocation and deallocation of buffer entries. When a request or response is issued which requires buffering of data, an entry in the buffer is allocated to store that data. When the message is completed, the entry is deallocated and made available for use by the next message issued. In this way, entries in the buffer 16 are filled or allocated and deallocated or freed up as the messages are processed.

The key to this invention, however, is how the buffer entries are managed. If all of the buffer 16 is treated as a shared pool where all of the buffer entries can be filled by requests or responses indiscriminately, there is a potential for system deadlock. In particular, since requests tie up system resources and buffer entries, and since responses are required to free up these system resources and deallocate buffer entries, the system can deadlock if all of the buffer entries are filled with requests and no responses can be processed. When no responses are processed the system resources can not be freed and the buffer entries can not be deallocated. To prevent this from occurring, the buffer entries could simply be split between requests and responses thereby assuring that both will get processed. This effectively again creates two separate paths for the two types of messages. This solution will prevent deadlocks; however, it is not a very efficient solution since only half of the available buffer space can be used to process one type of request no matter how many of the other type of request are pending. Thus, for a continuous stream of one type of message (requests or responses), this scheme effectively divides the system throughput in half The present invention serves to dynamically share as much of the available resources as possible, based on demand (i.e., based on the messages being issued), while still preventing deadlocks.

In an embodiment of the present invention, one entry in the buffer 16 is reserved for responses only, call it entry 0, and one entry in the buffer 16 is reserved for requests, call it entry 1. The remaining entries in the buffer 16, regardless of how many, are then treated as a shared pool for both responses and requests. Accordingly, the status control logic 18 monitors the buffer usage. Entry 0 and entry 1 will not be used unless and until the remainder of the buffer 16 is allocated or filled. As soon as it is filled, the status control logic 18 sends a control signal, Stop_Req. signal, to the pending transaction logic 12 to prevent any further requests from issuing until a predetermined portion of the buffer is freed up. In the meantime, responses can be processed through entry 0. By allowing responses to proceed, system resources such as memory or I/O devices 14 can be deallocated allowing pending requests to proceed to those same resources. Ensuring that responses will continue to be processed avoids system deadlock. When entry 0 is in use and the shared pool is completely allocated, then the status control logic 18 sends a control signal, Stop_Resp. signal, to the pending transaction logic 12 to allow requests to be sent to entry 1 of the buffer. This ensures that requests will have a minimum rate of service and will not be choked out by a continuous stream of responses.

This architecture and system utilize a maximum amount of the system resources as a shared pool to dynamically process requests and responses indiscriminately. By reserving one entry of the buffer resource for responses only and one entry for requests only, system deadlock is avoided and a minimum service rate is ensured for requests while sharing the remainder of the buffer resource.

Figure 2:
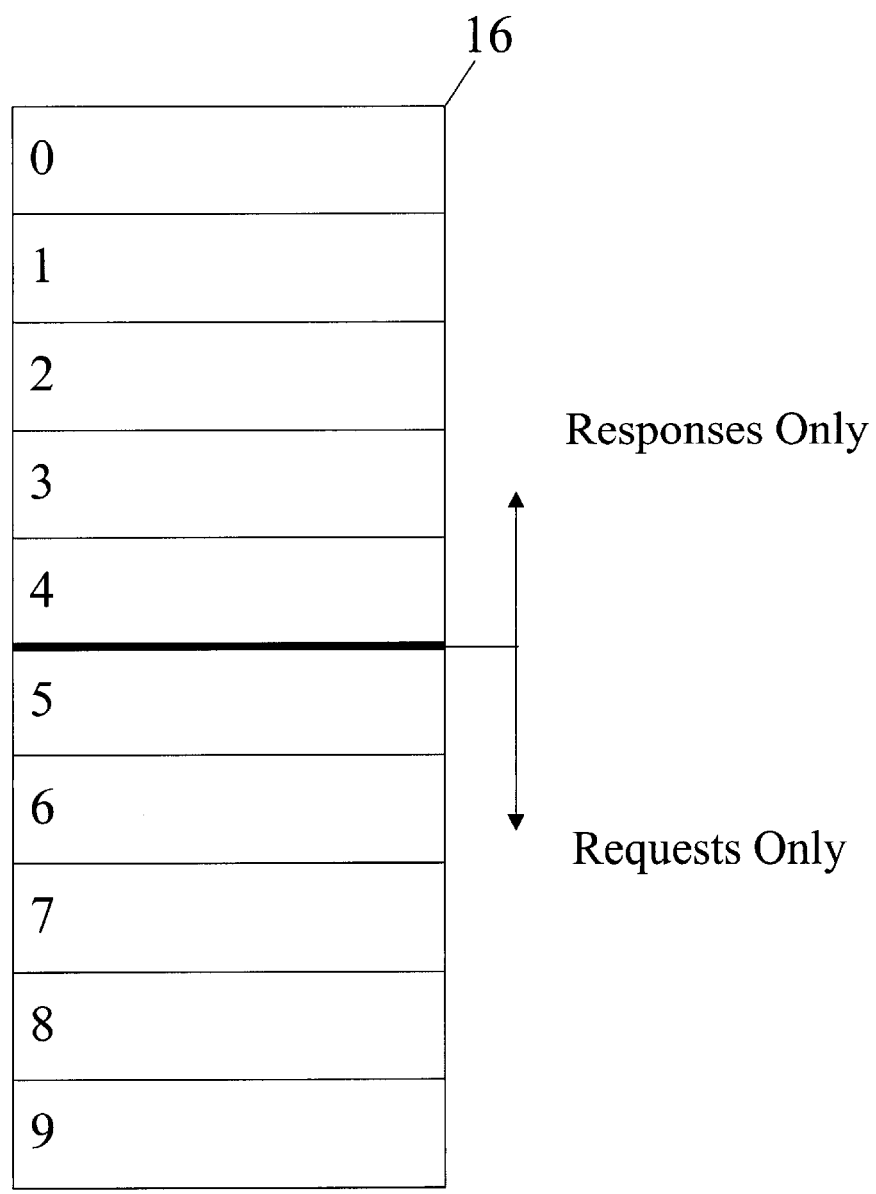
FIG. 2 shows a block diagram of a sample memory buffer allocation scheme often utilized prior to the present invention.

FIG. 2 shows a functional block diagram of a sample memory buffer 16. The memory buffer 16 is allocated pursuant to a resource management scheme prevalent prior to the present invention. In particular, FIG. 2 shows a 10-entry memory buffer wherein half of the available buffer size (5 entries–entry 0–4) is dedicated to response messages while the other half of the available buffer size (5 entries–entry 5–9) are dedicated to request messages. Under this scheme the system resources, here a buffer, are effectively separated between request and response messages to ensure responses are never excluded by a continuous stream of requests. The problem with this allocation scheme, however, is that at any given time only half of the system's available resources can be used to process a stream of responses or requests. For example, during a stream of continuous requests, only half of the buffer 16 can be utilized, entry 6–9, while the other half of the buffer, entry 0–4, lies unused waiting for responses. Since responses and requests may be issued in continuous streams, this is not the most efficient utilization of system resources to handle the processing of these messages.

Figure 3:
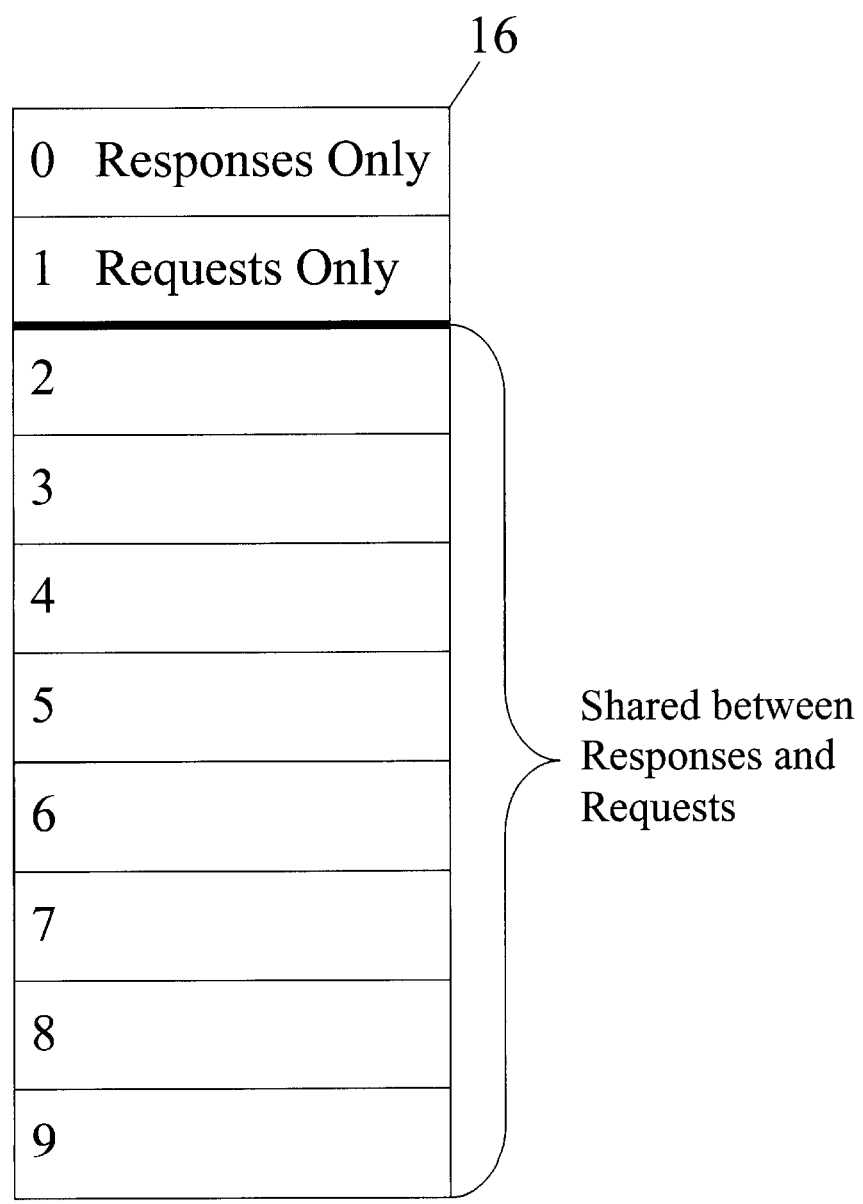
FIG. 3 shows a block diagram of a sample memory buffer allocation scheme as contemplated by the present invention.

FIG. 3 shows a block diagram of a sample memory buffer 16 allocated pursuant to the resource allocation scheme as contemplated by the present invention. In particular, memory buffer 16 has 10 entries, entry 0–entry 9. A single entry is dedicated to handle responses only, entry 0, and a single entry is dedicated to handle requests only, entry 1. It is understood that any buffer entries could be dedicated not just entry 0 and entry 1. In addition, more than one entry could be dedicated to request or response messages without departing from the scope of this invention. In this embodiment of the invention, however, the remaining entries, entry 2–9 in the sample 10-entry buffer 16 as shown, are shared between requests and responses. The key to increasing performance is allowing most of the system resources to be shared between requests and responses such that most of the system resources can be used to handle a continuous stream of either. By dedicating at least one entry to responses, progress of responses is guaranteed thereby ensuring system deadlock is avoided. By dedicating at least one buffer to requests, a minimum service rate for requests (that is, the rate at which requests are serviced) is ensured. This allocation scheme avoids deadlocks, guarantees minimum request rates, while enhancing system performance by dynamically utilizing more of the system's resources to process request or response messages even when issued in continuous streams.

The above discussion is meant to be illustrative of the principles and various embodiments of the present invention. While the invention has been particularly shown and described with respect to specific embodiments thereof, numerous variations and modifications will become apparent to those skilled in the art once the above disclosure is fully appreciated. It is intended that the following claims be interpreted to embrace all such variations and modifications.

What is claimed is:

1. Architecture for resource management and allocation of system resources in a microprocessor-based system, comprising:
    pending transaction logic managing request and response messages;
    a buffer having a plurality of entries coupled to said pending transaction logic for storing data associated with said request and response messages;
    status control logic coupled to said buffer for monitoring the allocation status of said entries in said buffer; and
    wherein a first entry of said buffer is reserved for response messages only and the remaining entries of said buffer are shared between said request and response messages.

2. The architecture of claim 1 wherein said first entry of said buffer is only used when the remaining entries of said buffer are allocated.

3. The architecture of claim 1 wherein a second entry of said buffer is reserved for request messages only.

4. The architecture of claim 3 wherein said second entry is only used when said first entry and the remaining entries of said buffer are allocated.

5. The architecture of claim 3 wherein said status control logic is coupled to said pending transaction control logic.

6. The architecture of claim 5 wherein a second signal is asserted to said pending transaction logic when the remaining entries of said buffer are allocated and said first entry of said buffer is allocated.

7. The architecture of claim 6 wherein, in response to said second signal, said pending transaction logic issues request messages only that may be allocated to said second entry of said buffer.

8. The architecture of claim 7 wherein said pending transaction logic continues to issue request messages only until said second signal is unasserted.

9. The architecture of claim 8 wherein said status control logic unasserts said second signal when either said first entry is unallocated or a predetermined amount of said buffer is unallocated.

10. The architecture of claim 1 wherein said status control logic is coupled to said pending transaction control logic.

11. The architecture of claim 10 wherein a first signal is asserted to said pending transaction logic when the remaining entries of said buffer are allocated.

12. The architecture of claim 11 wherein, in response to said first signal, said pending transaction logic issues response messages only that may be allocated to said first entry of said buffer.

13. The architecture of claim 12 wherein said pending transaction logic continues to issue response messages only until said first signal is unasserted.

14. The architecture of claim 11 wherein said status control logic unasserts said first signal when a predetermined amount of said buffer is unallocated.

15. The architecture of claim 1 wherein a plurality of entries of said buffer are reserved for response messages only and the remaining entries of said buffer are indiscriminately shared between said request and response messages.

16. The architecture of claim 1 wherein a plurality of entries of said buffer are reserved for request messages only and wherein said plurality of entries are only used when said first entry and the remaining entries of said buffer are allocated.

17. The architecture of claim 1 wherein the architecture has been implemented on-chip on a microprocessor die.

18. A method of managing and allocating system resources, comprising:
    providing pending transaction logic that manages request and response messages;
    providing a buffer having a plurality of entries coupled to said pending transaction logic for storing data associated with said request and response messages;
    providing status control logic coupled to said pending transaction logic and coupled to said buffer for monitoring the allocation status of said entries in said buffer;
    reserving a first entry of said buffer for response messages only; and
    sharing the remaining entries of said buffer between said request and response messages.

19. The method of claim 18 further comprising using said first entry only when said remaining entries of said buffer are allocated.

20. The method of claim 18 further comprising reserving a second entry of said buffer for request messages only.

21. The method of claim 20 further comprising using said second entry only when said first entry and the remaining entries of said buffer are allocated.

22. The method of claim 18 further comprising asserting a first signal to said pending transaction logic when the remaining entries of said buffer are allocated.

23. The method of claim 22 further comprising issuing response messages only that may be allocated to said first entry of said buffer, in response to said first signal being asserted.

24. The method of claim 22 further comprising unasserting said first signal when a predetermined amount of said buffer is unallocated.

25. The method of claim 22 further comprising asserting a second signal to said pending transaction logic when the remaining entries of said buffer are allocated and said first entry of said buffer is allocated.

26. The method of claim 18 comprising reserving a plurality of entries of said buffer for response messages only.

27. A computer system having architecture for resource management and allocation of system resources, comprising:
    an I/O device;
    a microprocessor;
    pending transaction logic coupled to said microprocessor and coupled to said I/O device where the pending transaction logic manages request and response messages to and from said microprocessor;
    a buffer having a plurality of entries coupled to said pending transaction logic for storing data associated with said request and response messages;

status control logic coupled to said buffer for monitoring the allocation status of said entries in said buffer; and wherein a first entry of said buffer is reserved for response messages only and the remaining entries of said buffer are shared between said request and response messages.

28. A method of managing and allocating system resources, comprising:

reserving a first entry of a buffer for response messages only, the buffer having a plurality of entries for storing data associated with request and response messages; and sharing the remaining entries of said buffer between said request and response messages.

* * * * *